US007142101B2

(12) United States Patent
Morris

(10) Patent No.: US 7,142,101 B2
(45) Date of Patent: Nov. 28, 2006

(54) AUTOMOBILE RECALL NOTIFICATION SYSTEM AND METHOD FOR USING THE SAME

(75) Inventor: Steven E. Morris, Fair Haven, MI (US)

(73) Assignee: General Motors Corporation, Detroit, MI (US)

(*) Notice: Subject to any disclaimer, the term of this patent is extended or adjusted under 35 U.S.C. 154(b) by 79 days.

(21) Appl. No.: 10/867,401

(22) Filed: Jun. 14, 2004

(65) Prior Publication Data

US 2005/0275515 A1 Dec. 15, 2005

(51) Int. Cl.
*B60Q 1/00* (2006.01)

(52) U.S. Cl. .......................... 340/438; 701/33; 701/29

(58) Field of Classification Search ................ 340/438, 340/618; 701/133, 29

See application file for complete search history.

(56) References Cited

U.S. PATENT DOCUMENTS 5,717,387 A * 2/1998 Suman et al. ................. 701/36
6,028,537 A * 2/2000 Suman et al. ............... 340/988
6,647,270 B1 11/2003 Himmelstein ............ 455/456.1
6,650,244 B1 * 11/2003 Chen et al. ................. 340/618
6,937,162 B1 * 8/2005 Tokitsu et al. .............. 340/928
2002/0186144 A1 * 12/2002 Meunier ................ 340/825.28
2003/0065427 A1 * 4/2003 Funk et al. ..................... 701/1
2003/0182034 A1 * 9/2003 Katagishi et al. ............. 701/33
2005/0165513 A1 * 7/2005 Obradovich .................. 701/1

* cited by examiner

*Primary Examiner*—Jeffery Hofsass
*Assistant Examiner*—Hoi C. Lau
(74) *Attorney, Agent, or Firm*—Laura C. Hargitt

(57) ABSTRACT

A method is provided for distributing a recall notification to an automobile equipped with an in-vehicle communications system. The method comprises the steps of providing a telematics service center with identification information corresponding to the automobile, matching the identification information with the corresponding in-vehicle communications system, and wirelessly transmitting the recall notification to the in-vehicle communications system. A system for distributing a recall notification to a vehicle, and a vehicle equipped with an in-vehicle communications system are also provided to carry out the method.

10 Claims, 2 Drawing Sheets

AUTOMOBILE RECALL NOTIFICATION SYSTEM AND METHOD FOR USING THE SAME

TECHNICAL FIELD

The present invention generally relates to automobile maintenance and repair, and more particularly relates to systems and methods for informing automobile owners of maintenance and repair needs.

BACKGROUND

The automobile industry is constantly developing systems and methods for encouraging and assisting automobile owners towards maintaining the automobile in good repair. For instance, some automobiles are equipped with warning lights or messages to remind the automobile owner of preventive maintenance schedules. Moreover, all automobiles are initially provided with gauges or warning devices that concern the state of at least the most essential engine components, fluids, and electrical sources to name a few.

In addition to providing technology encouraging wear-related repair and maintenance, automobile manufacturers will notify automobile owners of recall information. For instance, if post manufacturing tests or reports reveal common safety-related defects in a particular automobile model, the manufacturer will typically notify the owner of such defects and will provide information on where and how to replace the defective equipment. Manufacturers typically send such notifications to the last known owner using a mail carrier such as the U.S. Postal Service. However, since automobiles are frequently sold or otherwise exchanged after their initial sale, safety recall notifications are frequently sent to prior owners. Also, if an owner moves or travels for long periods of time, safety recall notifications may be received by the owner after the subject automobile equipment has already failed even if the notifications were mailed well in advance of the equipment failure. Furthermore, even if the owner receives the safety recall notification in advance of equipment failure, some owners disregard the notification or procrastinate taking the automobile in for repair before the subject equipment fails, often causing associated equipment failures that are even more costly to repair.

Accordingly, it is desirable to provide systems and associated methods for ensuring efficient safety recall notification delivery and responses. In addition, it is desirable to providing reliable methods for delivering such notifications. It is further desirable to provide technology that can prevent automobile equipment from failure during the time between safety recall notification and subsequent repair. Furthermore, other desirable features and characteristics of the present invention will become apparent from the subsequent detailed description and the appended claims, taken in conjunction with the accompanying drawings and the foregoing technical field and background.

BRIEF SUMMARY

A method is provided for distributing a recall notification to an automobile equipped with an in-vehicle communications system. The method comprises the steps of providing a telematics service center with identification information corresponding to the automobile, matching the identification information with the corresponding in-vehicle communications system, and wirelessly transmitting the recall notification to the in-vehicle communications system.

A system is also provided for distributing a recall notification. The system comprises a telematics service center, and a vehicle equipped with a vehicle control module, and an in-vehicle communications system comprising a communications module that is in wireless communication with the telematics service center and is electrically coupled to the vehicle control module.

A vehicle that is equipped with an in-vehicle communications system that is in wireless communication with a telematics service center is also provided. The vehicle comprises a communications module configured to receive signals from the telematics service center, and a vehicle control module that is electrically coupled to the vehicle control module.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the invention pertain to the use of telematics for communicating recall information to automobile owners. When recall information is communicated, it is important to also inform the owners of the associated dangers with any recalled equipment and the necessary precautionary measures that the owners should take before the recalled equipment is fixed or replaced. It is also desirable to inform the owners of the nearest available service center, or even couple the communication with a temporary or permanent replacement tool or program that can be utilized immediately in a substantially error proof manner. Consequently, coupling telephone communication and computer coded signals is an ideal way to efficiently communicate recall information and assist owners in preventing a safety failure.

Figure 1:
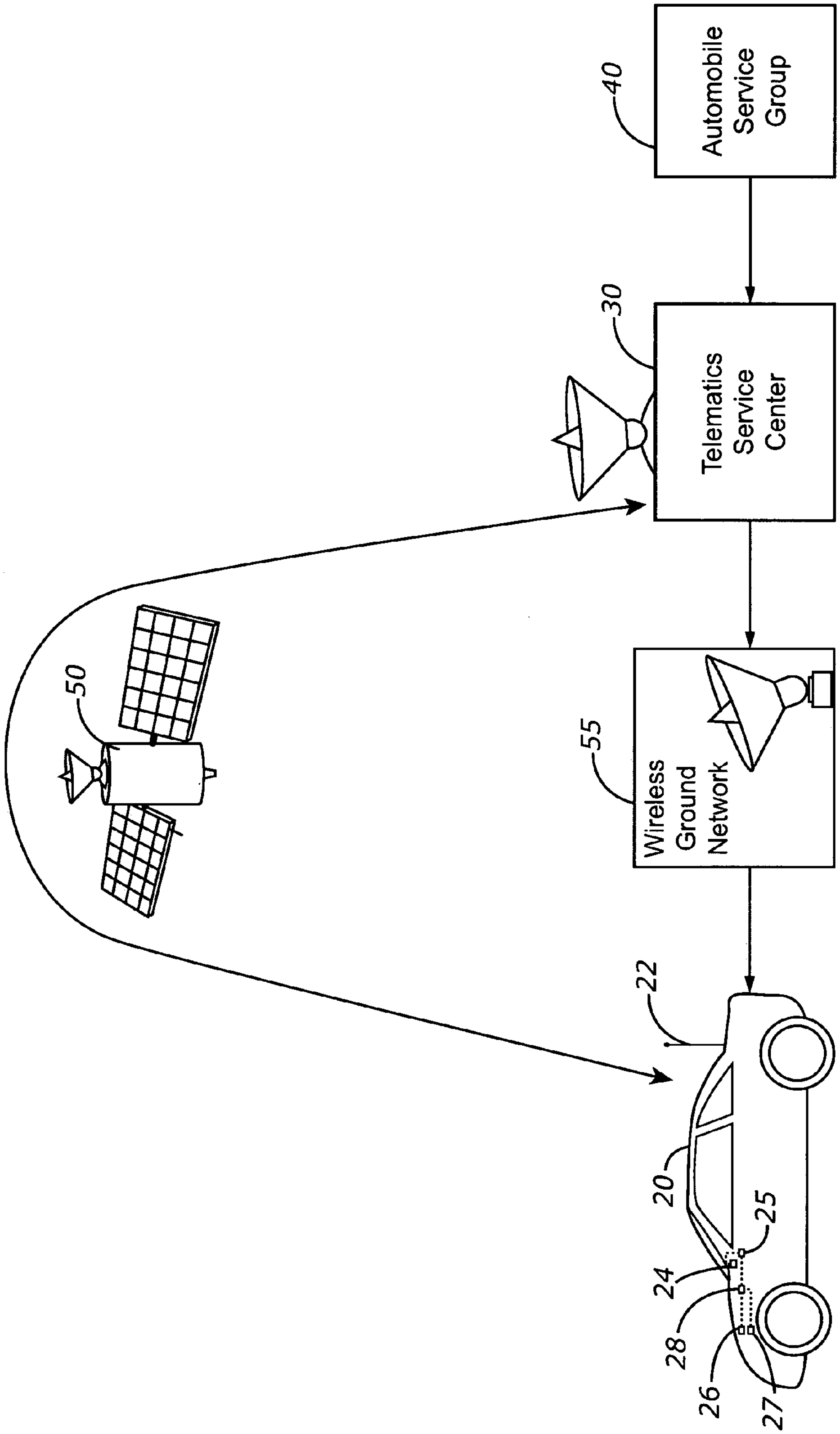
FIG. 1 is a flow diagram of a telematics-based recall reporting system according to an exemplary embodiment of the invention.

According to an exemplary embodiment of the invention for communicating recall information and other pertinent information to automobile owners as depicted in FIG. 1, an automobile 20 is equipped with an in-vehicle communications system, such as the OnStar® system produced by General Motors Corp., which includes a master communications module 24. The module 24 wirelessly communicates with a telematics communications center 30 using a satellite 50 as well as a wireless ground network 55 as signal transmission media. The master control module 24 is also coupled to at least one vehicle control module 28 in the automobile computer that is programmed to operate or regulate the operation of at least one automobile device 27 unassociated with the in-vehicle communications system, and preferably many automobile devices. The master control module 24 is also coupled to at least one telephone receiver 26 that converts electrical signals from the satellite 50 or wireless ground network 55 into sounds and transmits those sounds to the automobile occupant by way of a handset or other device incorporating a speaker.

Although FIG. 1 illustrates an automobile 20, it should be understood that the present invention can be used with any type of vehicle, including land, sea, and air vehicles.

The telematics communications center may transmit using an analog signal, and an exemplary embodiment operates in the conventional 800 MHz frequency range under a common industry standard known as advanced mobile phone services (AMPS). An analog voice message may be transmitted on a continuous radio wave using frequency modulation similar to an FM radio. An analog data signal is sent using a similar modulation technique known as frequency shift keying. If the digital signal is to be transferred to the vehicle computer, the vehicle control module 28 or other module coupled thereto will be equipped with an analog to digital converter. The telematics communications center may also transmit using a digital signal, in which a voice message is converted to a digital signal through a vocoder, and a digital data signal does not necessarily need decoding.

The telematics communications system such as the OnStar® system enables an automobile occupant to wirelessly access services from the communications center 30. The communications center 30 interfaces between an automobile service group 40 and the automobile 20 that is equipped with the in-vehicle communications system including a transceiver 22 for receiving information from the communications center 30.

Exemplary advanced recall notification methods according to the present invention functions are now described with reference to FIG. 2. The method includes using the OnStar® system to deliver the recall notification, although it is within the scope of the invention to use other telematics systems.

Beginning with step 110, the automobile service group 40 identifies an issue related to vehicle performance or safety and determines whether the issue warrants a recall. If a recall is not required, the method ends with no further action, designated as step 150. If further action is required, the automobile service group 40 determines whether the problem can be fixed by recalibrating the vehicle computer as step 115. If such a calibration will not permanently correct the problem, the automobile service group determines whether a temporary or "limp home" calibration to the automobile computer would be useful as step 120. If neither the permanent nor the temporary calibration would be useful, the automobile service group 40 identifies the affected vehicles by their vehicle identification numbers (VINs) and records a message that is subsequently supplied to the OnStar® service center 30 with the affected vehicle's VINs. The OnStar® service center 30 matches the VINs with telephone numbers for each affected automobile 20 and then sends the recall notification to every automobile 20 that is involved in the recall and is equipped with the in-vehicle communications system. The audible pre-recorded message including the recall notification is sent as a telephone call that is transmitted to the automobile 20 as step 130. In one embodiment of the invention, the telephone call is transmitted intermittently until the call is received by the automobile owner. According to an embodiment that includes providing the recall notification as a prerecorded message, the message may include a prompt for the automobile owner to verbally or otherwise affirm that the message has been received. Also, the message may include a prompt for the automobile owner to verbally or otherwise affirm that the message be re-sent as a reminder at a selectable or predetermined interval.

In another exemplary embodiment of the invention, the telematics service center also sends a signal that causes a visual display 25 to be provided as a reminder for the automobile owner to have the recall issue serviced. Providing the visual display 25 is performed as step 135 in FIG. 2, and may be as simple as having a "check engine" light illuminated on the automobile dash board display as a continued reminder of the recall issue. If the recall issue involves a particular automobile component such as seat belts, door latches, the coolant system, or other components that have specifically related icons on the automobile dash board display or elsewhere in the vehicle, providing the visual display 25 may include illuminating all pertinent icons. If the in-vehicle communications system in the automobile 20 includes a liquid crystal display or other display, providing the visual display 25 may also include sending a text message that appears on the vehicle communications system display as a continued reminder. Depending on the type of visual display 25, the master control module 24 may directly transmit the visual display 25 or instruct the vehicle control module 28 to transmit the visual display 25. The visual display 25 remains illuminated or otherwise displayed until all repairs have been completed and a service technician verifies completion by turning off the visual display 25 or causing it to be automatically turned off.

Using the OnStar® telematics system, the audio or visual notification can also include directions to the nearest service center. The OnStar® system includes a global positioning system that identifies the automobile's exact location, as well as up to date maps that include the locations of service centers. A recall notification that includes detailed driving directions to a service center allows the automobile 20 to be quickly serviced, avoiding safety concerns or other inconveniences associated with the recall.

Figure 2:
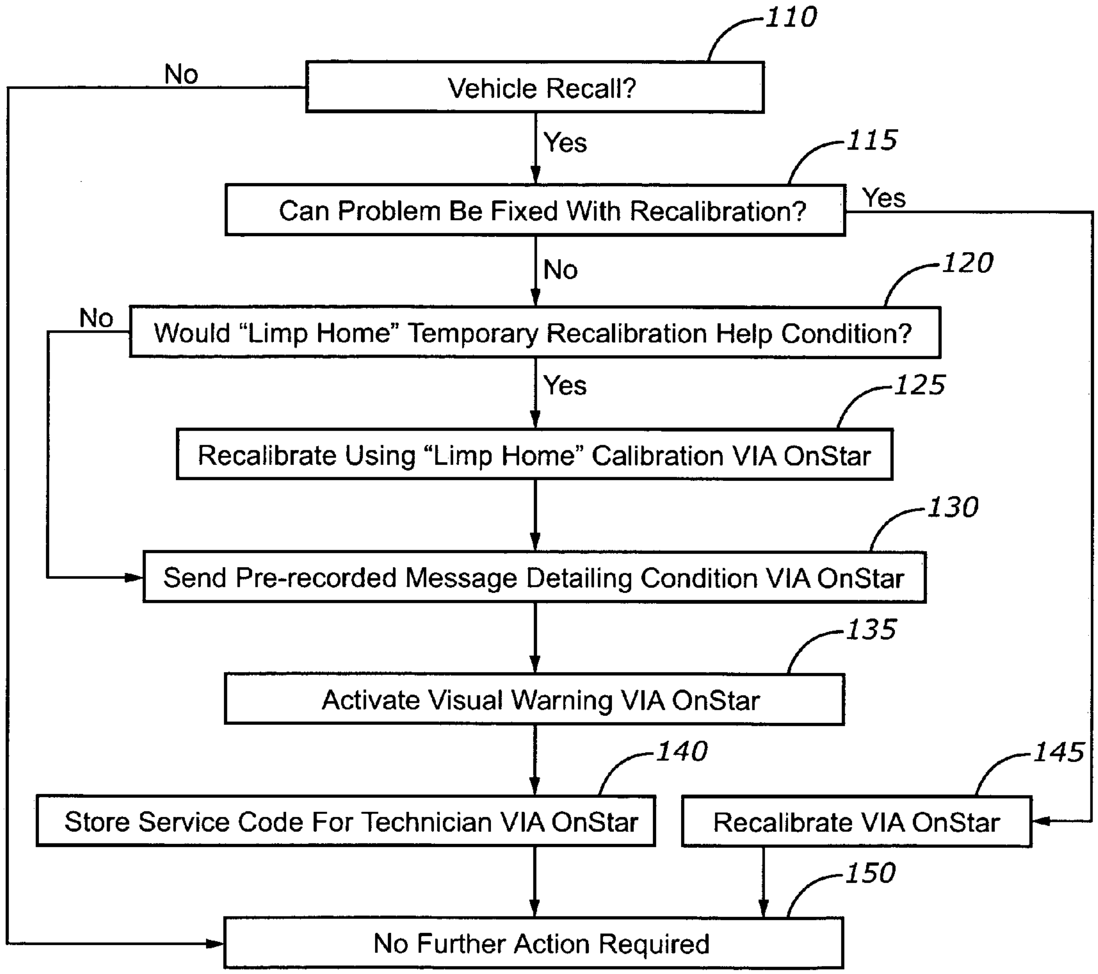
FIG. 2 is a flow diagram of a telematics-based recall reporting method according to an exemplary embodiment of the invention.

In another exemplary embodiment of the invention, a "repair required" code is stored in the vehicle control module 28 as step 140 in FIG. 2. The code alerts a technician that a repair is needed, and also provides detailed information regarding the nature of the needed repair associated with the recall. The code is stored in the vehicle control module 28 until the repair is performed and the technician verifies completion by erasing the code or causing it to be automatically erased.

Despite the notification abilities provided by the present invention, automobile owners may procrastinate taking the automobile to a dealership for repairs. Consequently, another embodiment of the present invention removes the need for immediate repair or replacement of the recalled equipment at a dealership or other service center by recalibrating the vehicle control module 28 directly through the telematics communication system. If the recall is the result of the automobile computer, the recall notification can be transmitted together with a software patch or code that recalibrates the vehicle control module 28. The recalibration can permanently repair the automobile, and such a permanent recalibration is designated as step 145 in FIG. 2. Alternatively, a temporary or "limp home" calibration, designated as step 130, can be transmitted to simply regulate the automobile and thereby prevent recalled equipment from failing.

For example, if the automobile service group 40 determines that an engine coolant fan temperature switch is poorly calibrated and causes the automobile 20 to overheat, the automobile service group 40 would provide the VIN for the recalled automobile to the telematics service center 30, along with a software patch or code that recalibrates the temperature switch controlling commands for the vehicle control module 28. The new temperature switch controlling commands may provide a permanent repair for the control module 28. Alternatively, the new controlling commands may simply recalibrate the control module 28 to cause the fan to run whenever the automobile 20 is running as a temporary repair to prevent breakdown until the automobile 20 is taken to a dealership for a permanent repair. As another example, if the automobile service group 40 determines that the automobile tires are susceptible to being separated above a particular speed, the automobile service group would provide the telematics service center with a software patch or code that recalibrates the vehicle control module 20 to shut off the fuel supply to the engine at a maximum safe speed. Either of the above codes would be transmitted by the telematics service center 30 to the vehicle control module during the telephone call to the automobile owner.

The various embodiments of the invention discussed above overcomes the inefficiencies and errors associated with mailing recall notifications to automobile owners by using telematics for communicating the recall information. The notification quickly informs the owners of the nearest available service center and the nature of the recall, and can even be coupled with a temporary or permanent recalibrating program that can be utilized immediately in a substantially error proof manner.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method of distributing a recall notification to a vehicle equipped with an in-vehicle communications system including an on-board global positioning system, comprising the steps of:

distributing recall notification data, including identification information corresponding to the vehicle, to a telematics service center;

matching the identification information with the corresponding in-vehicle communications system;

wirelessly transmitting the recall notification to the in-vehicle communications system in response to the recall notification data, the recall notification being transmitted with a prompt for the automobile owner to affirm that the message be re-sent as a reminder at a selectable interval.

2. The method according to claim 1, wherein the identification information corresponding to the vehicle is provided by a vehicle service group.

3. The method according to claim 1, wherein the recall notification is transmitted as a telephone call.

4. The method according to claim 3, wherein the telephone call includes a pre-recorded audio message.

5. The method according to claim 1, wherein the recall notification is transmitted together with a signal that provides a visual notification to the vehicle.

6. The method according to claim 1, wherein the vehicle comprises a computer with a vehicle control module, and the recall notification is transmitted together with a code that is stored in the vehicle control module and describes a necessary repair associated with the recall notification.

7. The method according to claim 1, wherein the vehicle comprises a computer with a vehicle control module, and the recall notification is transmitted together with a code that recalibrates the vehicle control module.

8. The method according to claim 1, wherein the vehicle control module is recalibrated to prevent a recalled vehicle component failure.

9. The method according to claim 4, wherein the pre-recorded audio message includes a prompt for the automobile owner to affirm that the message has been received.

10. The method according to claim 1, further comprising the step of:

wirelessly transmitting directions to a nearby service center to the on-board global positioning system in response to the recall notification data.

* * * * *